(12) United States Patent
Ojanen

(10) Patent No.: US 6,843,519 B2
(45) Date of Patent: Jan. 18, 2005

(54) ALUMINUM EXTRUDED TAILGATE CONSTRUCTION

(75) Inventor: Lassi M. Ojanen, Richmond Hill (CA)

(73) Assignee: Magna International Inc., Aurora (CA)

( * ) Notice: Subject to any disclaimer, the term of this patent is extended or adjusted under 35 U.S.C. 154(b) by 0 days.

(21) Appl. No.: 10/468,942

(22) PCT Filed: Feb. 21, 2002

(86) PCT No.: PCT/CA02/00195

§ 371 (c)(1),
(2), (4) Date: Aug. 21, 2003

(87) PCT Pub. No.: WO02/066313

PCT Pub. Date: Aug. 29, 2002

(65) Prior Publication Data

US 2004/0084925 A1 May 6, 2004

Related U.S. Application Data

(60) Provisional application No. 60/269,879, filed on Feb. 21, 2001.

(51) Int. Cl.[7] .................................................. B60P 1/267
(52) U.S. Cl. .................... 296/50; 296/57.1; 296/37.6
(58) Field of Search ........................ 296/50, 57.1, 37.6,
296/37.1, 26.11, 61, 26.08, 62, 146.5; 224/542,
405; 49/501

(56) References Cited

U.S. PATENT DOCUMENTS

| 4,639,032 A | * | 1/1987 | Barbour ........................ 296/62 |
| 4,861,088 A | * | 8/1989 | Fedrigo ....................... 296/57.1 |
| 5,028,063 A | * | 7/1991 | Andrews ....................... 296/62 |
| 5,215,346 A | * | 6/1993 | Reitzloff et al. ............. 296/37.6 |
| 5,372,397 A | * | 12/1994 | Arndt ......................... 296/57.1 |
| 5,456,511 A | * | 10/1995 | Webber ....................... 296/57.1 |
| 5,518,158 A | * | 5/1996 | Matlack ...................... 296/37.6 |
| 5,741,039 A | * | 4/1998 | Habdas ....................... 296/57.1 |
| 5,788,311 A | * | 8/1998 | Tibbals ....................... 296/26.11 |
| 5,947,540 A | * | 9/1999 | Pariseau et al. .............. 296/50 |
| 5,975,608 A | * | 11/1999 | Jarman ....................... 296/26.11 |
| 6,170,724 B1 | * | 1/2001 | Carter et al. ................. 296/37.6 |
| 6,250,874 B1 | * | 6/2001 | Cross .......................... 296/61 |
| 6,364,391 B1 | * | 4/2002 | Everett ....................... 296/57.1 |
| 6,378,926 B1 | * | 4/2002 | Renze et al. ................. 296/26.11 |
| 6,431,630 B1 | * | 8/2002 | Meinke ........................ 296/50 |
| 6,471,279 B2 | * | 10/2002 | Pommeret .................... 296/57.1 |
| 6,672,642 B1 | * | 1/2004 | Seksaria et al. .............. 296/50 |
| 2001/0013710 A1 | * | 8/2001 | Pommeret .................... 296/57.1 |
| 2003/0000980 A1 | * | 1/2003 | Muizelaar et al. ........... 296/37.1 |

FOREIGN PATENT DOCUMENTS

| DE | 295 03 592.7 U1 | 3/1995 |
| DE | 201 15 023 U1 | 12/2001 |

* cited by examiner

*Primary Examiner*—Kiran Patel
(74) *Attorney, Agent, or Firm*—Clark Hill PLC

(57) ABSTRACT

A tailgate (1) for a vehicle cargo box has top (5) and bottom (3) aluminum structural members held in spaced relationship from one another by rigid end members. The aluminum structural members are preferably made from an extrusion process making the tailgate light and strong as well as cost effective.

11 Claims, 7 Drawing Sheets

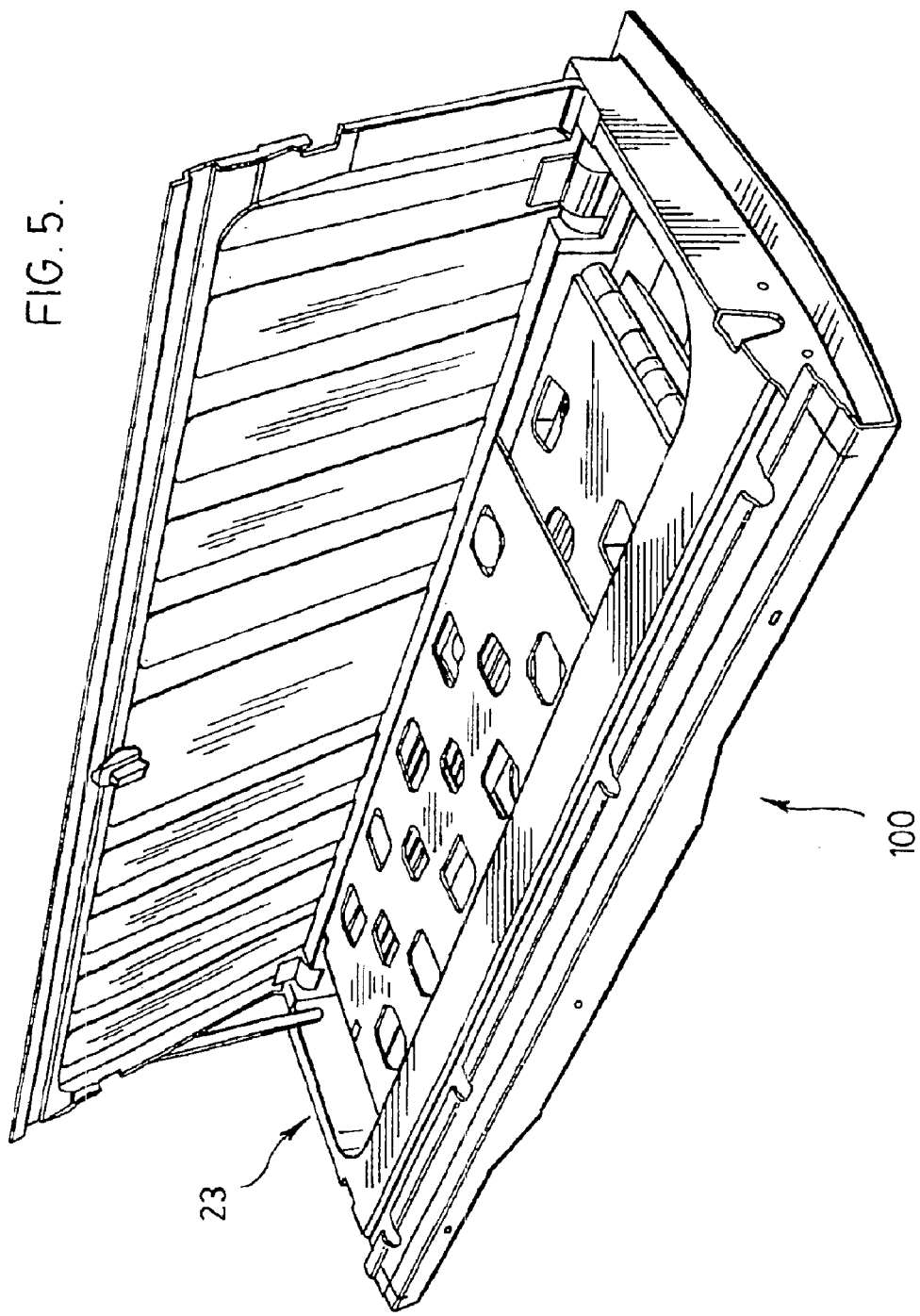

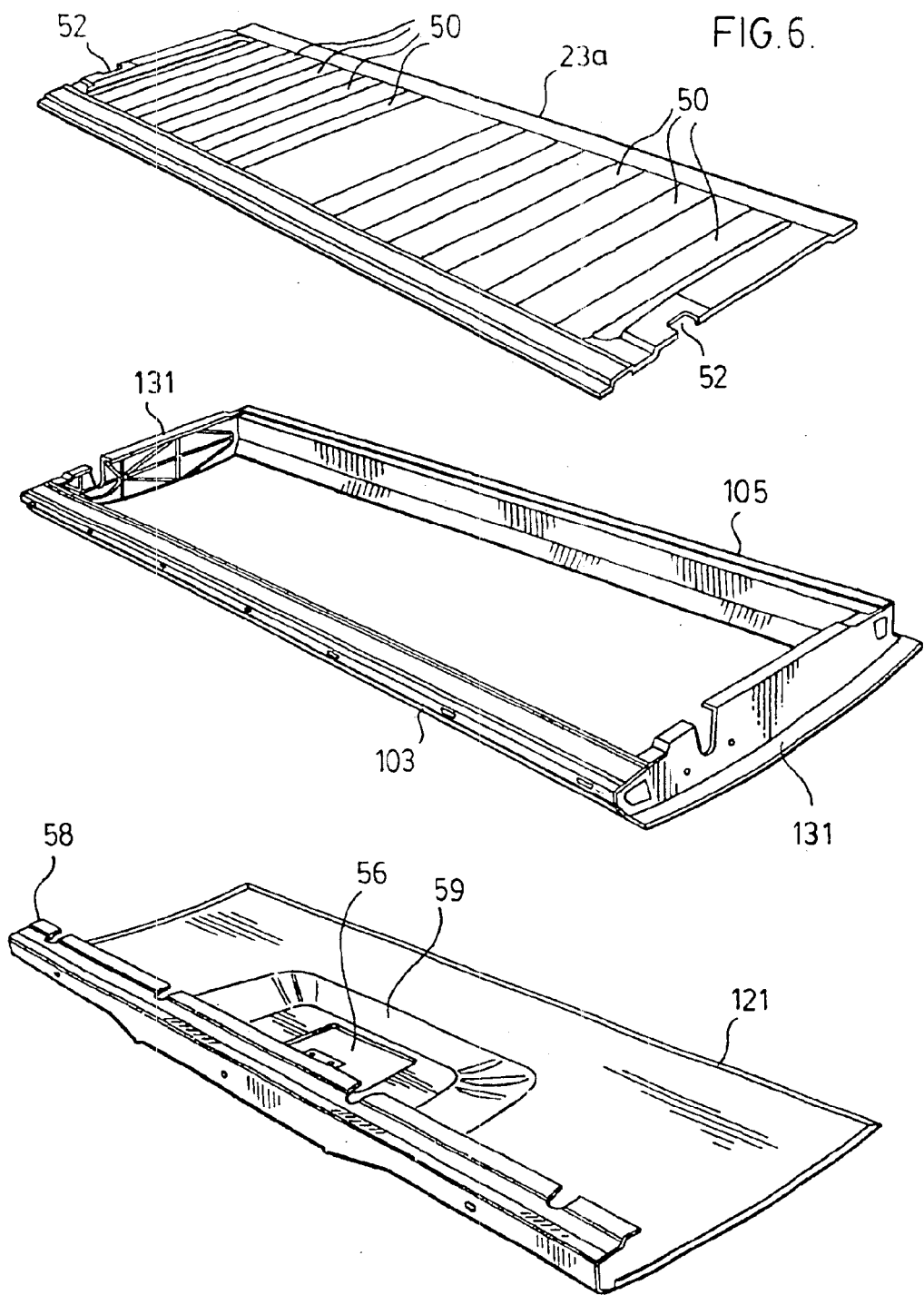

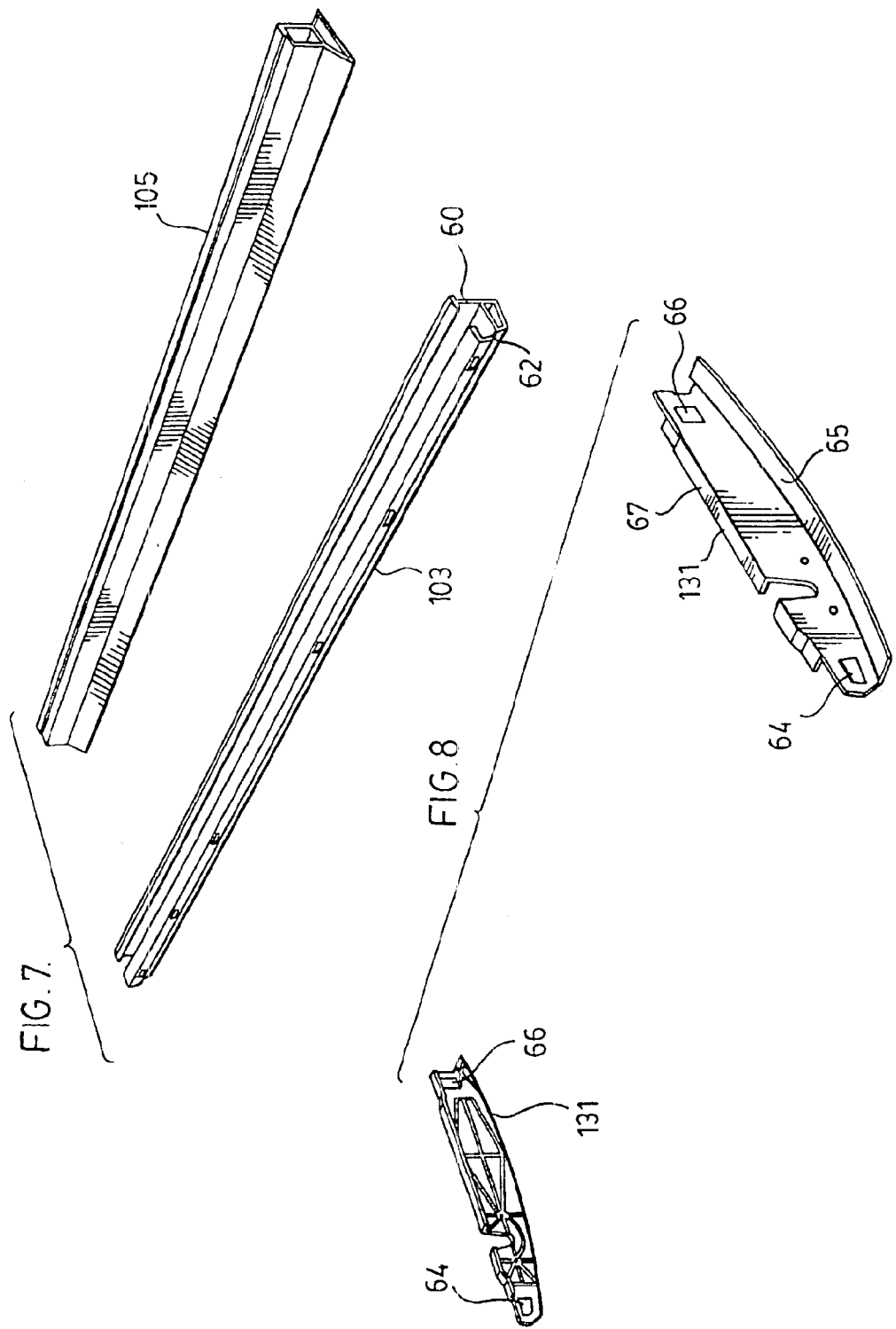

ALUMINUM EXTRUDED TAILGATE CONSTRUCTION

This application claims the benefit of provisional application No. 60/269,879, filed Feb. 2, 2001.

FIELD OF THE INVENTION

The present invention relates to a novel light weight cost effective construction of a vehicle cargo box tailgate.

BACKGROUND OF THE INVENTION

Tailgates, especially for pick-up trucks, are commonly manufactured in thin-gauge-steel sheet metal utilizing progressive die stamping and edge hemming technology.

Typically, steel tailgates are closed shell structures with added-in hardware for hinges, latches, handles etc. resulting into relatively heavy assembly, but very suitable for high volume low cost production and long lasting durable tailgate exposed to abusive conditions. However, relatively heavy weight of the current steel tailgate may limit any additional features or increase in size to be incorporated into tailgate. Additional reinforcements must be engineered into surrounding structures to prevent premature failure due to increased weight Some composite tailgates have been designed and manufactured in the past to overcome the weight issue. Usually, the resulting tailgate is relatively high cost, non-recyclable, but suitable for low volume production.

SUMMARY OF THE PRESENT INVENTION

The present invention overcomes the difficulties encountered with conventional tailgates as described above by forming the tailgate of the present invention from top and bottom aluminum structural members which are held in spaced relationship from one another by rigid end caps. To enhance the cost of effectiveness of the tailgate the aluminum structural members are preferably made from an extrusion process.

According to an aspect of the present invention the tailgate is completed with an exterior panel, which spans the top and bottom structural members and which is used to fit the hardware to the tailgate. This exterior panel is once again preferably made from a lightweight material such as aluminum, plastic, composite materials etc.

According to another aspect of the invention the strong lightweight construction of the tailgate allows it to incorporate an internal storage compartment for receiving items such as cargo ramps which are also usable as cargo box extenders.

BRIEF DESCRIPTION OF THE DRAWINGS

The above as well as other advantages and features of the present invention will be described in greater detail according to the preferred embodiments of the present invention in which:

FIG. 5 is a perspective view of a second embodiment of a vehicle cargo box tailgate according to the present invention;

FIG. 6 is an exploded perspective view of a variant of the vehicle cargo box tailgate of the embodiment of FIG. 5;

FIG. 7 is a perspective view of the structural members of the embodiment of FIG. 5;

FIG. 8 is a perspective view of the end caps of the embodiment of FIG. 5;

DETAILED DESCRIPTION OF THE PREFERRED EMBODIMENT

Figure 1:
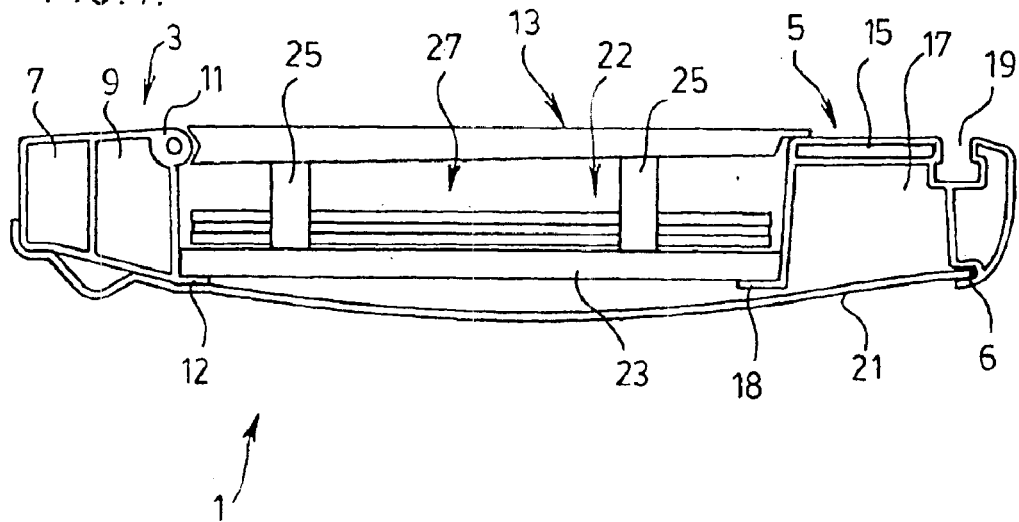
FIG. 1 is a cross sectional view of a vehicle cargo box tailgate according to a preferred embodiment of the present invention.

FIG. 1 is a sectional view of a tailgate generally indicated at 1 according to a preferred embodiment of the present invention. This tailgate opens and closes the rear end of a vehicle cargo box defined by a cargo floor and walls of the cargo box upright relative to the cargo floor. Tailgate 1 pivotally connects at its lower end generally indicated at 3 in FIG. 1 to the cargo box and moves between a vertical position closing the cargo box and a horizontal position as shown in FIG. 1 to open the back of the cargo box.

The key to the present invention resides in the construction of the lower end structural member 3 and the upper end structural member 5 of tailgate 1. These members are both formed from aluminum and then held in spaced relationship from one another by end members or end caps generally indicated at 31 in FIG. 2 of the drawings.

The aluminum structural members or rails 3 and 5 are preferably made in an extrusion process which makes them extremely accurate and also cost efficient from a mass production standpoint.

End caps 31 are preferably die cast and are made from a rigid material e.g. light weight steel or even aluminum to maintain appropriate separation of structural members 3 and 5 relative to one another.

The tailgate is completed with an external panel 21 to receive hardware for operation of the tailgate.

As will be seen in FIG. 1 panel 21 hooks over the bottom outside edge of lower structural member 3 while the upper structural member 5 includes a recess 6 to receive the upper end of panel 21.

Panel 21 referred to in the industry as a class "A" panel may be made from materials such as aluminum, plastic or composite materials sufficiently strong to receive the tailgate hardware which would include latches and handles etc. for mounting the tailgate to the cargo box of the vehicle.

Each of the frame members 3 and 5 has a substantially hollow construction further adding to the overall lightweight of the tailgate.

More particularly, structural member 3 includes a pair of hollow chambers 7 and 9 while structural member 5 includes a small hollow chamber 15 and a larger chamber 17. Structural member 5 is then completed with a T-shaped channel 19, which is used as a locking channel for the tailgate latches.

In a particular embodiment shown in FIG. 1 the tailgate includes a hollow storage compartment generally indicated at 22. This storage compartment is used for storing many different types of items internally of the tailgate. The storage compartment is closed on its front or internal side by means of a compartment door 13 secured by pivot pins (not shown) fitted through hinge forming eyelets 11 extruded with the lower structural member 3.

In the embodiment shown in FIG. 1, the tailgate includes an insert 23, which is supported by the right angle returns 12 and 18 of the structural members 3 and 5 respectively. This particular insert includes bosses 25 for receiving a plurality of members generally indicated at 27, which stack on the bosses. Members 27 comprise cargo ramp members, which can be additionally configured to provide box extenders for the vehicle cargo box.

Insert 23 can be replaced with any number of different kinds of insert specifically designed to receive particular items such as for example, fishing gear, hunting gear etc.

In accordance with the present invention the light weight construction of the tailgate afforded by the use the aluminum structural members 3 and 5 enables the tailgate to be provided with things such as the internal storage compartment without being heavier or at least substantially heavier than conventional steel tailgates. In addition the tailgate of the present invention can be made larger than a conventional steel tailgate to incorporate things such as internal compartments while remaining relatively light due to the use of the aluminum structural member construction.

Figure 2:
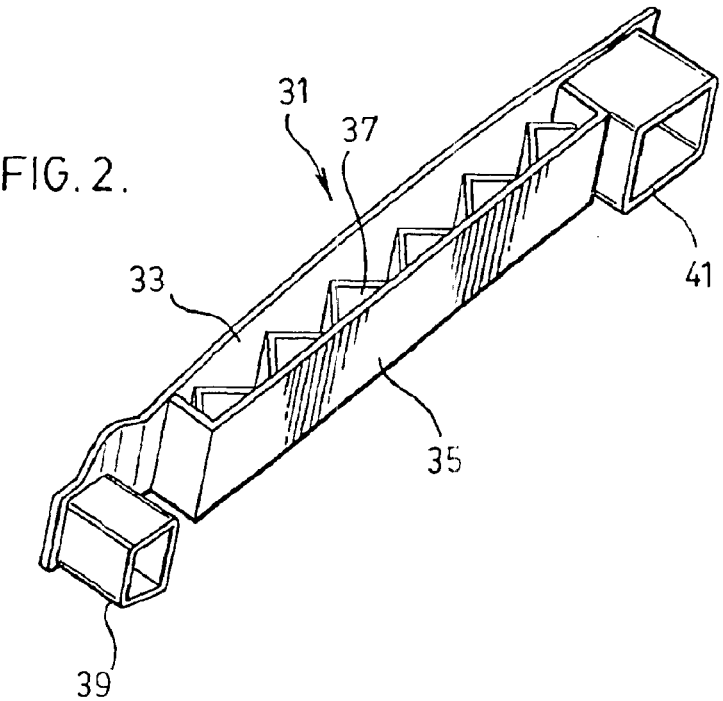
FIG. 2 is a perspective view of a rigid end cap used with the tailgate construction of FIG. 1.

FIG. 2 shows one of the end caps 31 used to hold the tailgate construction together. Both end caps are identical.

End cap 31 includes an outside end wall 37 and interior wall 35. In FIG. 2 one side of the end cap is removed to show that it has a substantially hollow interior completed by corrugations 37 which add to the strength without adding substantially to the weight of the end cap. The lower end of the end cap includes a hollow post or insert members 39 while the upper end of the end cap includes a hollow post or insert 41. Post 39 inserts and secures within the hollow chamber 7 of the lower structural member 3 while the upper post 41 inserts and secures within the hollow chamber 17 of the upper structural member 5 of the tailgate.

It should be noted that the small chamber 15 in the upper structural member 5 in affect provides a double wall for latches and the like to be used for securing the inner panel 13 which forms the door to the storage compartment 22 in the tailgate.

Figure 3:
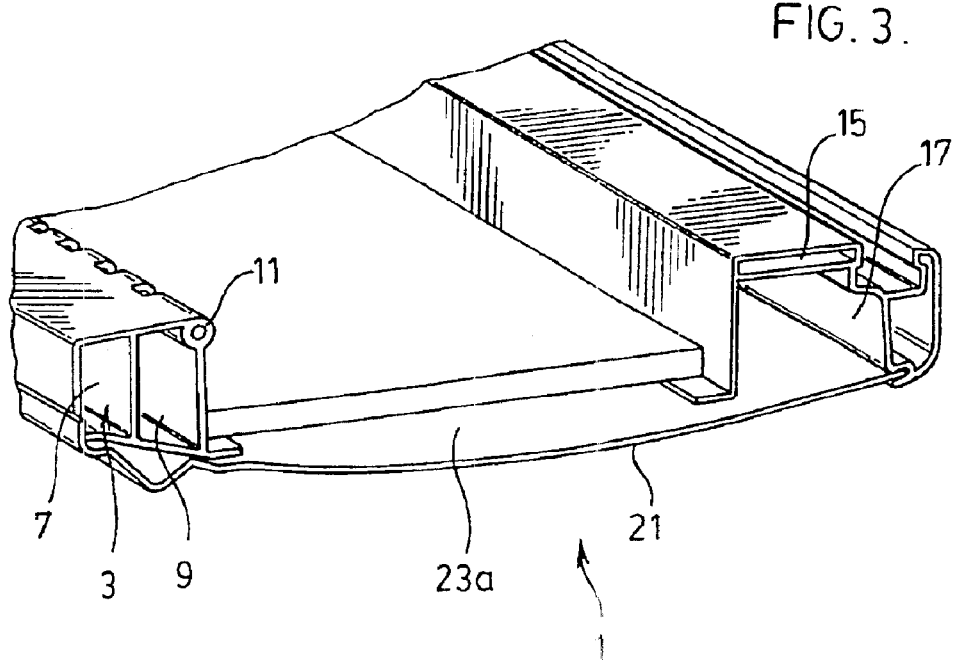
FIG. 3 is a perspective view looking down on the section tailgate of FIG. 1 without the interior tailgate panel.
Figure 4:
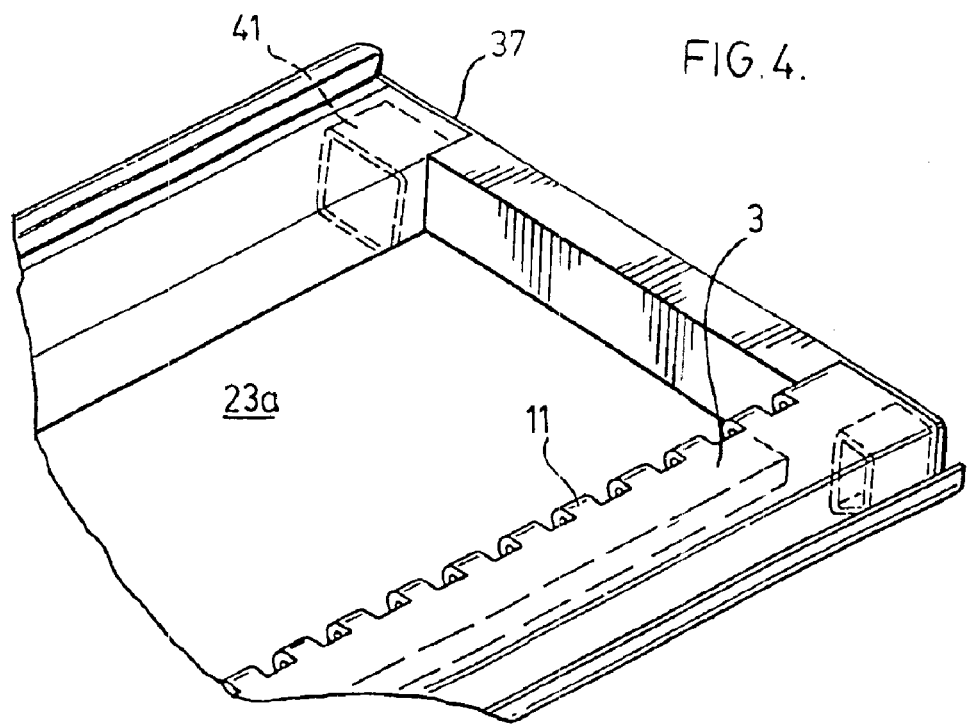
FIG. 4 is a perspective view of a partially exploded tailgate fitted with the end cap of FIG. 2.
Figure 9:
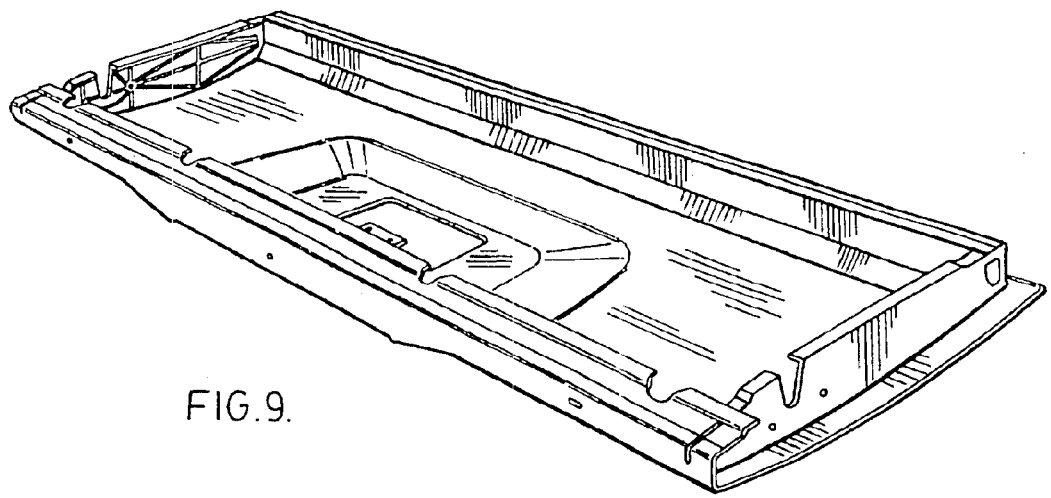
FIG. 9 is a perspective view of a partially assembled tailgate of FIG. 5.
Figure 10:
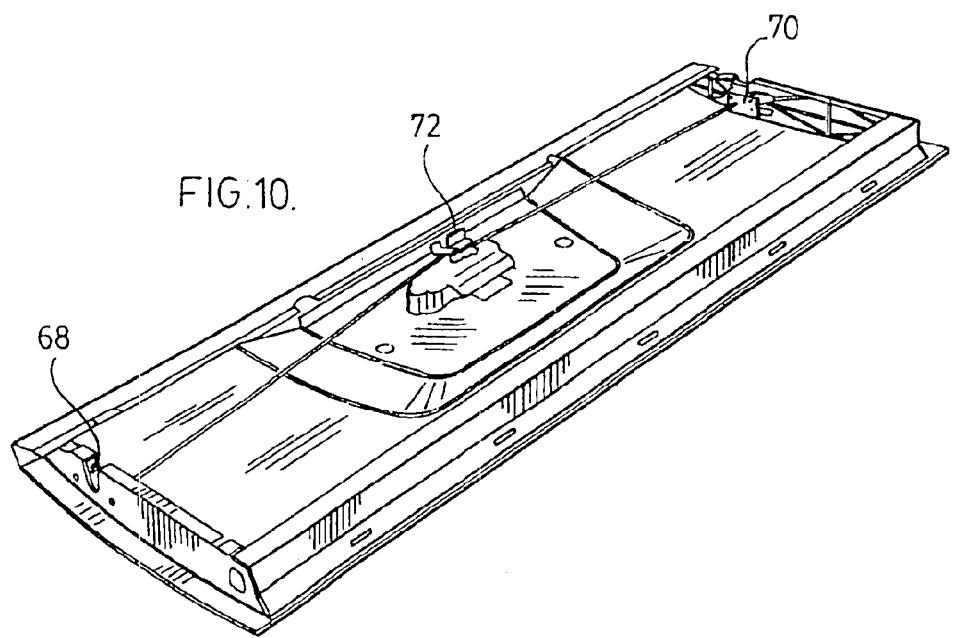
FIG. 10 is a perspective view of the tailgate of FIG. 5, with the inner panel removed, illustrating the latching hardware.

FIGS. 3 and 4 show tailgate 1 when fitted with a flat insert 23a in replacement of the earlier described insert 23. Note that insert 23a has no specific locating surfaces and can be used to receive many different types of items including clothing items and the like which can be stored in the tailgate. The compartment of the tailgate is easily made weather proof to protect these types of items from external factors.

The tailgate of the present invention provides substantial benefits over existing tailgates. Some of these benefits include recyclability, the ability to paint in an ELPO system, the suitability for high volume production with durability and lower capital invest with greater design freedom.

FIGS. 5–10 illustrate a second embodiment 100 of the present invention The tailgate 100 is similar to tailgate 1 except that the profile of the structural members 103 and 105 are different from structural members 3 and 5, the end caps 131 may be stamped and the outer panel 121 wraps completely around the structural member 103.

The second embodiment 100 has an open central portion that is able to receive insert 23. If the insert is not included, the panel 23a is secured to cover the opening and present a working surface. As is well known in the art, the panel 23a is formed with a series of rib formations 50 that provide structural rigidity to the panel 23a. Preferably, panel 23a is stamped from a single sheet of metal, which stamping will also form cutouts 52 that provide access to the latches mounted on the end caps 131.

The outer panel 121 is also preferably formed from a sheet of metal, preferably utilizing a stamping and roll forming operation. The stamping operation forms the well 54 and opening 56, as well as the cut outs in the edge of the sheet. The roll forming creates the wrap around 58.

Referring to FIG. 7, the structural member 103 has a closed boxed section with a pair of flanged arms 60, 62 extending therefrom. Arm 60 has a T flange at the distal end and the arm 62 has a single flange extending towards the arm 60. Preferably, arm 62 is canted away from arm 60. The arms 60, 62 define a channel corresponding to channel 19 of the first embodiment.

Structural member 105 has a pair of boxed sections, a rectangular portion and a rhombic portion.

Preferably, structural members 103 and 105 are extruded aluminum.

End caps 131 are similar to end caps 31 except that the end caps 131 are of simpler design allowing other manufacturing techniques. The end caps 131 has two stamped bosses presenting insert members 64, 66. The insert members 64, 66 are shaped to receive and engage the structural members 103, 105 in a frictional fit. End caps has an outer flange 65 that presents an outer bonding surface and an inner flange 67 that presents an inner bonding surface.

To assemble the tailgate 100, the end caps 131 are presented to the structural member 103, 105 to form an open frame section as shown in the middle illustration of FIG. 6. The end caps 131 are preferably welded to the structural members 103, 105. The outer panel 121 is then presented to the box section by wrapping the wrap around 58 about the structural member 103. The outer panel 121 is then affixed to the outer bonding surface of the end caps 131 by any suitable means such as adhesive bonding, welding, rivets etc. The latching hardware and hinges, namely latches 68, 70 and control handle 72 are then installed in a conventional manner. If the insert 23 is required, then the insert is affixed to nest within the central cavity of the tailgate and bonded to the inner bonding surface of end caps 131. If not required, the panel 23a is affixed, preferably by tucking the panel 23a under the lip formed in the wrap around 58 and then bonded about the three remaining edges.

Figure 11:
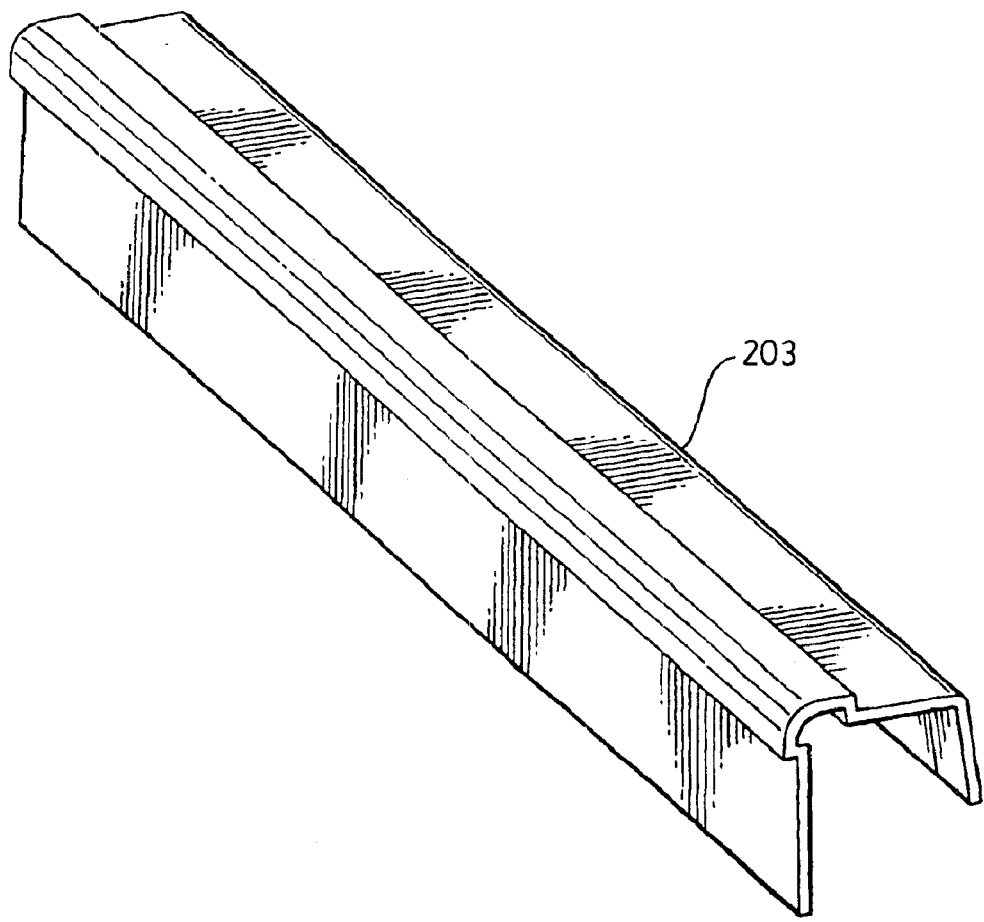
FIG. 11 is a perspective view of a roll formed structural member.

Referring to FIG. 11, a further variant of the structural member is illustrated. In this variant, the structural member 203 has an open profile enabling the structural member 203 to be formed by a roll forming process rather than an extrusion process. Structural member 203 is preferably utilized when the insert 23 is not to be incorporated into the finished product.

The structural integrity of the tailgate of the present invention has been analyzed utilizing computer modeling. The computer modeling surprisingly confirms that the tailgate of the present invention is as strong or stronger than a conventional tailgate currently being sold on pick up trucks. The conventional tailgate has a series of ribs extending between the structural members and occupying the interior volume. The present invention is able to provide a tailgate of reduced weight compared to a conventional tailgate and additionally being able to provide the interior volume as usable space.

Although various preferred embodiments of the present invention have been described in detail, it will be appreciated by those skilled in the art that variations may be made without departing from the scope of the appended claims.

What is claimed:

1. A tailgate for a vehicle cargo box, said tailgate comprising:
    a first and second aluminum structural member held in spaced relationship from one another by rigid end caps presenting an open frame section;
    an exterior panel spanning and affixed to said frame section; and
    an inner panel spanning said frame section,
    characterized by said first and second aluminum structural members being extruded and having a closed cross-section.

2. A tailgate as claimed in claim 1 wherein each of said end caps has a first and second insert member, each configured to engage the first and second structural members, respectively.

3. A tailgate as claimed in claim 2 wherein said exterior panel is made from a material selected from the group of materials consisting of aluminum, plastic and composite materials.

4. A tailgate as claimed in claim 3 wherein said inner panel is pivotally mounted and movable between open and closed positions to open and close a storage compartment internally of said tailgate.

5. A tailgate as claimed in claim 4 wherein said tailgate further comprises an insert shaped to receive items placed in said storage compartment.

6. A tailgate as claimed in claim 5 wherein said insert is configured to receive ramps storable within said storage compartment.

7. A tailgate as claimed in claim 3 wherein one of said aluminum structural members is formed with hinge forming members.

8. A tailgate as claimed in claim 7 wherein the other of said structural members are is roll formed having an open section.

9. A tailgate as claimed in claim 3 wherein the other of said structural members are welded in said end caps.

10. The tailgate as claimed in claim 9 wherein said insert members are stamped bosses.

11. The tailgate as claimed in claim 10 further comprising a pair of latches, each mounted on opposite end caps and a common handle mounted to extend through said outer panel, said common handle operably connected to each of said latches for simultaneous operation thereof.

* * * * *

UNITED STATES PATENT AND TRADEMARK OFFICE
CERTIFICATE OF CORRECTION

PATENT NO. : 6,843,519 B2
DATED : January 18, 2005
INVENTOR(S) : Ojanen

It is certified that error appears in the above-identified patent and that said Letters Patent is hereby corrected as shown below:

Column 1,
Line 8, "light weight" should be -- lightweight --

Column 6,
Line 13, delete "are".
Line 15, "claim 3" should be -- claim 8 --.

Signed and Sealed this

Twenty-fourth Day of May, 2005

JON W. DUDAS
*Director of the United States Patent and Trademark Office*